Patented June 19, 1951

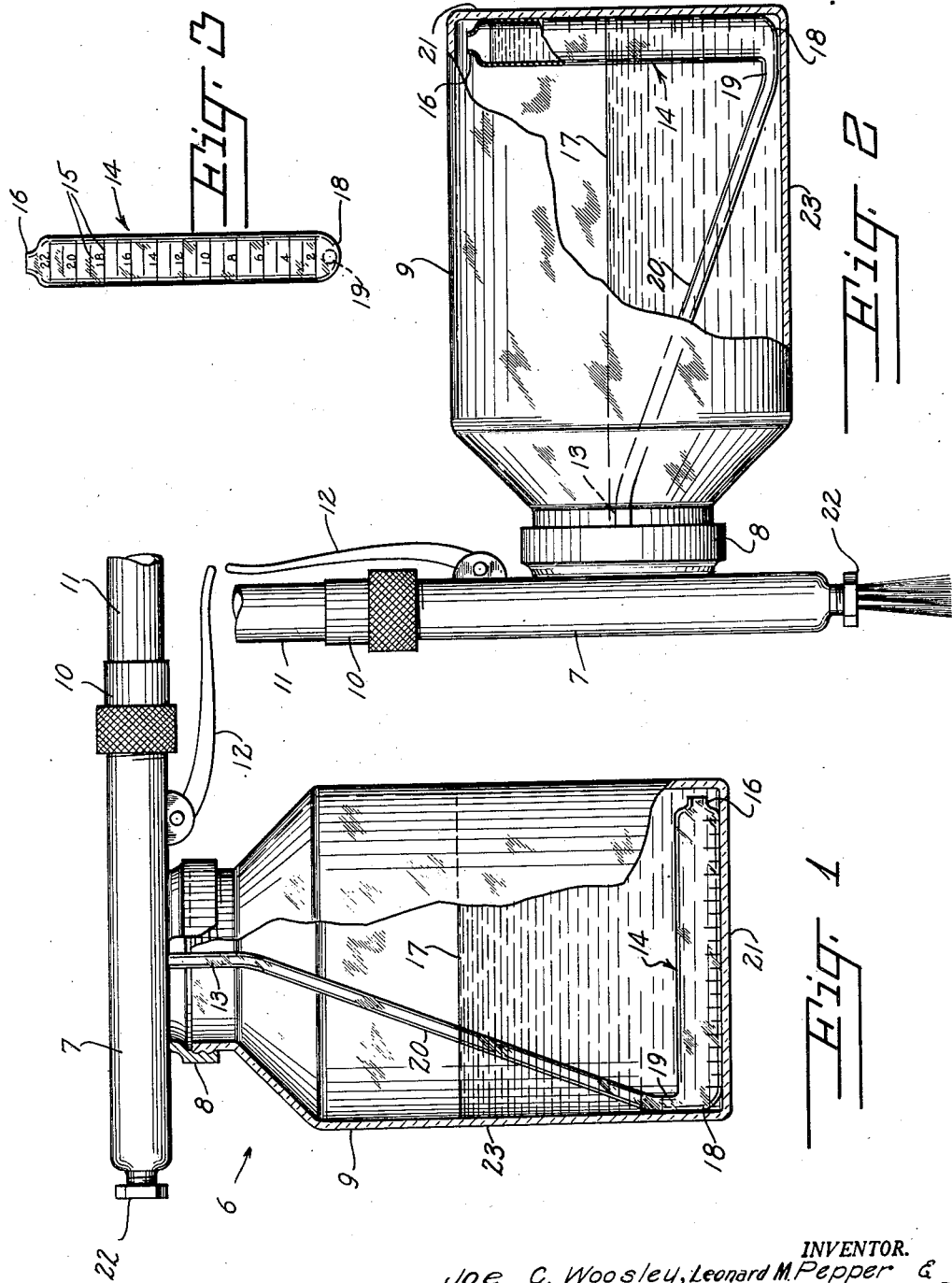

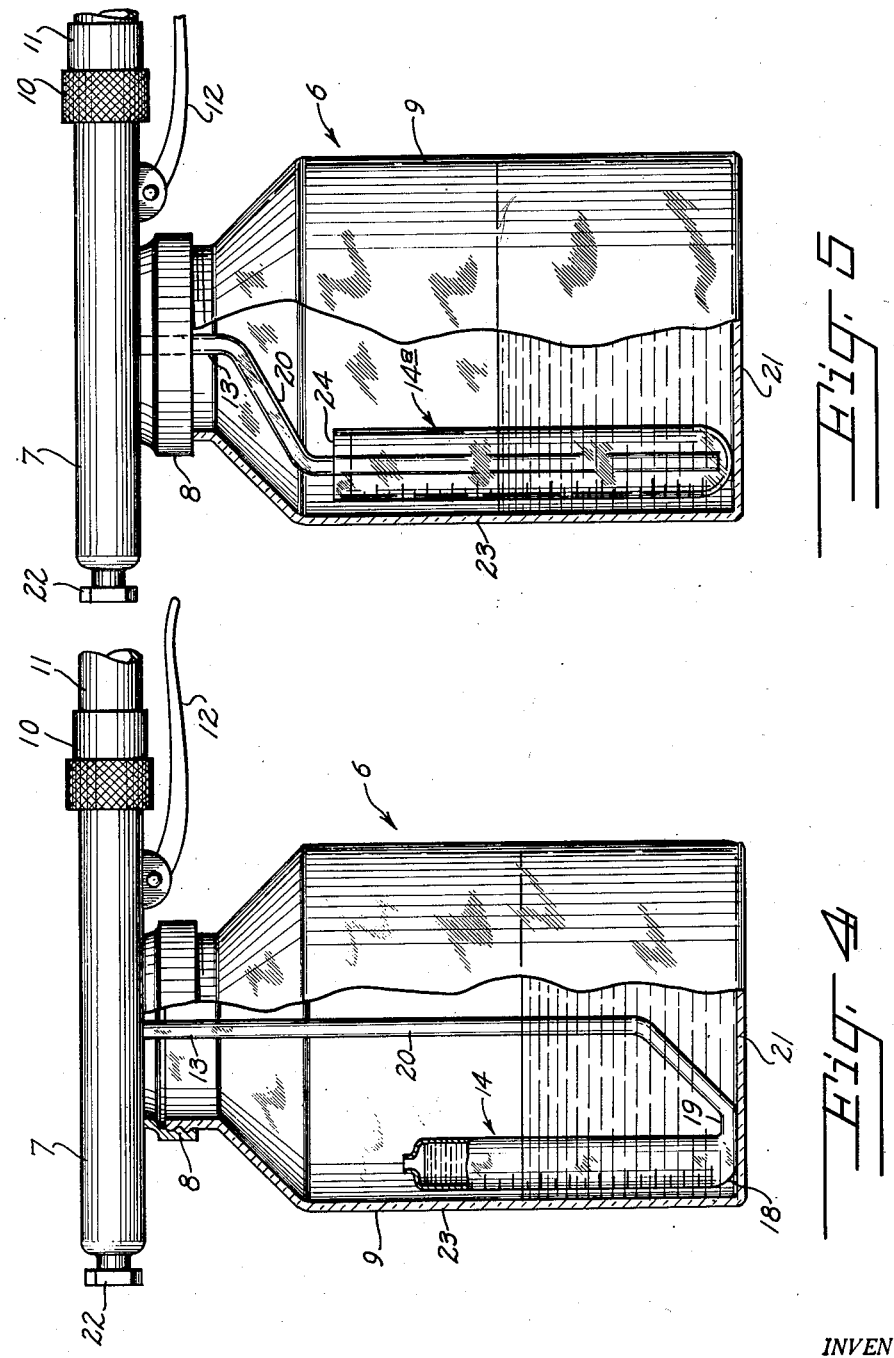

2,557,243

UNITED STATES PATENT OFFICE 2,557,243

SPRAY GUN OR THE LIKE

Joe C. Woosley, Leonard M. Pepper, and
Ernest E. McCoy, Jr., Clinton, Miss.

Application March 19, 1948, Serial No. 15,874

1 Claim. (Cl. 299—88)

This invention relates to improvements in devices operated by compressed air or gas for spraying liquids and liquid in suspension, and the primary object of the invention is to provide means whereby such devices can be modified to spray no more than predetermined measured quantities or volumes of liquid, less than the amount of liquid present in their reservoirs or other sources of liquid supply, as a result of either continuous or intermittent operation of a spraying device.

Another important object of the invention is to provide means of the character indicated above which make possible visually controlled spraying of fractional portions of an original measured quantity of liquid, whereby the original measured quantity can be sprayed in equal or unequal measured amounts at spaced intervals of time.

Another important object of the invention is to provide means of the character indicated above which exactly limits the total amount of liquid which can be sprayed by a spraying device during continuous or intermittent operation thereof, to an amount less than that available in the reservoir or other liquid supply of the spraying device, and enables a visual check upon the amount of such total amount remaining where the total has been exhausted by operation of the spraying device.

Another important object of the invention is to provide a visual measuring attachment for the transparent reservoir or liquid container of a conventional spray gun or the like, in the form of a graduated vessel visible through the transparency of the reservoir or container, connecting at one end with the spray nozzle of the gun and open at its opposite end to intake liquid from the reservoir or container only in certain positions of the gun other than the position in which the gun is held during spraying operations, whereby the operator can visually check the consumption of the liquid in the graduated measuring vessel against the graduations appearing thereon, during continuous or intermittent operation of the gun, so as to be able to maintain control of the total amount or fractional amounts of liquid sprayed upon a given surface area or other place.

Other important objects and advantageous features of the invention will be apparent from the following description and appended drawings, wherein, merely for purposes of illustration, several specific embodiments of the invention are set forth in detail.

In the drawings:

Figure 1 is a side elevation, partly broken away, of an embodiment of the invention involving a conventional spray gun and a liquid measuring means arranged in the reservoir thereof where the gun is utilized for the spraying of horizontal surfaces.

Figure 2 is a view similar to Figure 1, with the gun tilted in position for spraying horizontal surfaces and showing the measuring vessel filled with the quantity of liquid to which the gun is limited for spraying while in the tilted position.

Figure 3 is a side or end elevation of the measuring vessel showing the graduations thereon.

Figure 4 is a view similar to Figure 1, of another embodiment of the invention in which the measuring vessel is vertically positioned to function while the spray gun is used in spraying vertical surfaces, and, Figure 5 is a similar view of another embodiment of the invention, similar to that shown in Figure 4, except for a modified form of measuring vessel.

It is important in various industrial, scientific, and medical processes involving the spraying of liquids, such as paints, lacquers, and various solutions, including liquid suspensions of solid particles, that exact control be predetermined and maintained of the amount of liquid sprayed, the surface area covered and the density of the sprayed material over a given area. Heretofore, such control has been established and maintained by expensive and complicated means, requiring special or unusual skill for their operation and maintenance. However, by the means supplied by the present invention such control may be inexpensively established and maintained and may be utilized and applied by ordinary workmen or others not specially skilled, with very little addition to the manipulations usually involved in the spraying operations.

Referring to the drawings in detail, showing the above mentioned specific embodiments of the invention, all of the illustrated embodiments involve a conventional form of spray gun generally designated 6. However, it will be understood that the invention has similar application to other forms of spraying apparatus.

The type of spray gun 6 shown in the drawings involves a spray nozzle 7 including a receptor 8 into which the open end of the transparent reservoir 9 is screwed, a coupling 10 to which the compressed air hose 11 is connected for operating the gun, a lever handle 12 controlling the air valve (not shown) within the nozzle, and the liquid take-up tube 13 leading to the nozzle, the nozzle also having suitable compressed air connection (not shown) with the interior of the reservoir 9.

In the embodiment of the invention illustrated in Figures 1 through 4, the measuring vessel 14 is in the form of a hollow glass, or other suitable transparent material, cylinder having longitudinally spaced graduations 15 along a side next to and visible to the operator of the spray gun, through a transparent wall of the reservoir 9. One end of the vessel 14 is constricted as indicated at 16 to provide a restricted opening shaped to preclude the splashing of the liquid content 17 of the reservoir 9 into the open end of the vessel during the usual spraying manipulations of the spray gun, while providing sufficient intake of the liquid from the reservoir, a manner hereinafter described. The opposite end of the measuring vessel 14 is domed, as indicated at 18 and has a reduced lateral connection 19 with a tube 20 leading to and connected with the gun take-up tube 13. It will be understood that the liquid capacity of the vessel 14 when full corresponds with the measured maximum amount of liquid contemplated for a selected continuous or intermittent spraying operation or pass.

In the embodiment of the invention shown in Figures 1 and 2, which contemplates the spraying of horizontal surfaces, the measuring vessel 14 is positioned diametrically and along the bottom wall 21 of the transparent reservoir 9, with the open end 16 of the measuring vessel directed away from the discharge end 22 of the spray nozzle 7. Thus, in the vertical position of the spray gun 6, shown in Figure 1, the vessel 14 is submerged in the liquid content 17 of the reservoir, whereas in the horizontal or reducing position of the gun in which it is held while spraying a horizontal surface, as shown in Figure 2, the open end 16 of the measuring vessel is above the surface of the liquid 17.

In the embodiment shown in Figure 4, intended for spraying vertical surfaces, the measuring vessel 14 is arranged along the side wall 23 of the transparent reservoir 9 with the closed lower end 18 adjacent to the bottom wall 21 and the restricted open upper end 16 above the level of the liquid content 17 of the reservoir. This arrangement makes it necessary to tilt the gun 6 into a horizontal or reclining position in order to submerge the intake 16 of the vessel 14 in the liquid 17.

The embodiment of Figure 5 is also designed for the spraying of vertical surfaces, and the modified measuring vessel 14a, is also arranged vertically along the side wall 23 of the transparent reservoir 9, with its domed and wholly closed lower end 18a adjacent to the reservoir bottom wall 21. The open end of the measuring vessel is in this instance unrestricted and unreduced in diameter as in the preceding embodiments but is instead open to the full diameter of the vessel 14a, as indicated at 24. Instead of the tube 20 having a connection with the closed end of the vessel 14a, the tube 20 is axially inserted in the vessel through the opening 24 to a point close to the lower end of the vessel.

Filling the measuring vessels of the above described embodiment of the invention involves substantially the same operations. The gun is tilted until the open end of the measuring vessels is submerged in the reservoir's liquid content 17 and the valve handle 12 is worked, with the nozzle 7 directed into a waste basket, so that compressed air coming through the pipe 11 forces liquid from the reservoir 9 to fill the measuring vessel and pass on through the tube 10 and spray from the nozzle tip 22. The gun is then retilted to the working position, whereupon it will be found that the measuring vessel is full to capacity with the predetermined amount of liquid to be sprayed. In the event that it is desired to spray a total quantity of liquid less than the full capacity of the measuring vessel, the operator simply works the valve handle 12 while holding the spray nozzle in a waste basket or the like, until the level of the liquid in the measuring vessel subsides to a selected lower one of the graduations 15, as seen through the transparent reservoir, whereupon the operator is ready to commence the continuous or interrupted spraying operation or pass, with assurance that no more than the predetermined amount of liquid can be sprayed by the gun, during the pass, as long as he maintains the gun in the spraying position and does not permit it to fall into a tilted position while the handle 12 is in open position. While in the cases of the embodiments shown in Figures 1 through 4, the restricted opening retains the liquid in the measuring vessel even when the gun 6 is tilted sharply out of operating position, the unrestricted opening 24 of the measuring vessel 14a of the embodiment of Figure 5 permits the liquid to spill out of the vessel 14a when the gun is sharply tilted.

What is claimed is:

A spray gun comprising a reservoir open at one end for holding liquid to be dispensed, a closure on the open end of said reservoir, a spray nozzle arranged transversely of said reservoir adjacent to and exteriorly of said closure and carried by the closure, a calibrated tubular measuring vessel positioned within and lying along one wall of said reservoir and having its ends spaced from another wall of said reservoir bounding said one wall, one of the ends of said vessel having a restricted opening through which liquid may enter said measuring vessel in one position of the reservoir, a rigid tube positioned within said reservoir and having one end extending through said closure and connected to said nozzle and having the other end connected to the other of the ends of said vessel, and means on said nozzle for connecting a source of air under pressure thereto to thereby cause all of the liquid contained in the vessel to be forcibly ejected from said nozzle when the reservoir is shifted to another position.

JOE C. WOOSLEY.
LEONARD M. PEPPER.
ERNEST E. McCOY, Jr.

REFERENCES CITED

The following references are of record in the file of this patent:

UNITED STATES PATENTS

| Number | Name | Date |
| --- | --- | --- |
| 503,837 | Evans | Aug. 22, 1893 |
| 1,461,960 | Bastian | July 17, 1923 |
| 1,770,185 | Stewart | July 8, 1930 |
| 2,064,726 | Brown | Dec. 15, 1936 |
| 2,196,800 | Krautzberger | Apr. 9, 1940 |
| 2,331,117 | Goodhue et al. | Oct. 5, 1943 |

FOREIGN PATENTS

| Number | Country | Date |
| --- | --- | --- |
| 10,861 | Germany | Oct. 4, 1880 |
| 10,709 | Great Britain | Aug. 4, 1887 |
| 336,354 | Germany | Apr. 30, 1921 |
| 370,052 | Germany | Feb. 26, 1923 |
| 753,767 | France | Aug. 21, 1933 |